United States Patent [19]

Grützmacher et al.

[11] Patent Number: 4,897,584
[45] Date of Patent: Jan. 30, 1990

[54] DEVICE AND METHOD FOR DETECTING THE COIL TEMPERATURE OF A DIRECT-CURRENT MOTOR, ESPECIALLY A BRUSHLESS DIRECT-CURRENT MOTOR

[75] Inventors: Bertold Grützmacher, Schriesheim; Peter Eiswirth, Heidelberg; Helmut Meyer, Dossenheim, all of Fed. Rep. of Germany

[73] Assignee: Heidelberger Druckmaschinen AG, Heidelberg, Fed. Rep. of Germany

[21] Appl. No.: 162,874

[22] Filed: Mar. 2, 1988

[30] Foreign Application Priority Data

Mar. 2, 1987 [DE] Fed. Rep. of Germany ....... 3706659

[51] Int. Cl.⁴ .......................... G01K 7/16; H02H 7/08; G05D 23/20
[52] U.S. Cl. ....................................... 318/471; 361/25; 374/152; 374/142; 374/183; 374/184; 324/691
[58] Field of Search ............... 374/152, 142, 163, 183, 374/184; 324/65 R, 62, 57 Q, 57 PS; 318/399, 471, 472, 473, 334, 254; 361/24, 25

[56] References Cited

U.S. PATENT DOCUMENTS

| | | | |
|---|---|---|---|
| 2,575,922 | 11/1950 | Langenwalter | 310/68 C |
| 2,912,644 | 11/1954 | Makous | 324/62 R |
| 2,927,267 | 4/1957 | Petritz | 324/57 PS |
| 3,676,770 | 7/1972 | Sharaf et al. | 324/62 R |
| 3,731,189 | 5/1973 | Sharaf et al. | 324/62 R |
| 4,075,557 | 2/1978 | Jurca | 324/57 Q |
| 4,195,254 | 3/1980 | Gurwicz et al. | 318/334 |
| 4,207,602 | 6/1980 | Kussy et al. | 361/25 |
| 4,721,894 | 1/1988 | Graber | 318/473 |
| 4,748,388 | 5/1988 | Müller | 318/439 |

FOREIGN PATENT DOCUMENTS

| | | |
|---|---|---|
| 115536 | 10/1975 | Fed. Rep. of Germany . |
| 211181 | 7/1984 | Fed. Rep. of Germany . |
| 3424873 | 2/1986 | Fed. Rep. of Germany . |
| 242536 | 2/1987 | Fed. Rep. of Germany . |
| 53-7284 | 1/1978 | Japan ................... 318/473 |
| 57-62796 | 4/1982 | Japan ................... 318/473 |
| 2075291 | 11/1981 | United Kingdom ....... 318/473 |

OTHER PUBLICATIONS

*Webster's II New Riverside University Dictionary*, 1984, p. 1000.

*Primary Examiner*—William A. Cuchlinski, Jr.
*Assistant Examiner*—Diego F. F. Gutierrez
*Attorney, Agent, or Firm*—Herbert L. Lerner; Laurence A. Greenberg

[57] ABSTRACT

A device and method for detecting the coil temperature of a direct-current motor by determining the resistance of at least one coil of the motor. The method includes measuring a parameter of the at least one coil while the motor is running. The measurement is made at a time interval in which the coil is without current. The measuring device includes a commutation circuit of the motor which generates a time interval used for measuring the current.

12 Claims, 2 Drawing Sheets

DEVICE AND METHOD FOR DETECTING THE COIL TEMPERATURE OF A DIRECT-CURRENT MOTOR, ESPECIALLY A BRUSHLESS DIRECT-CURRENT MOTOR

BACKGROUND OF THE INVENTION

Description of the Related Art

The invention relates to a device and method for detecting the coil temperature especially of a direct-current motor, and especially a brushless d-c motor, by determining the ohmic resistance or resistivity of at least one coil of the motor.

It is generally known that when a direct-current motor is running, it is particularly the coil thereof that is heated, and therefore during full-load running or operation or under extreme conditions of use, the heating of the coil requires special attention. For this purpose, different temperature-measuring devices have become known heretofore.

A first possibility for determining the coil temperature is known, for example, wherein a temperature sensor is provided in the coil by means of which the temperature of the coil can be measured. However, this device has the disadvantage that the temperature can only be measured at the very location of the sensor. This means that excessive local temperature rises in other regions of the coil or the mean temperature or total temperature distribution in the coil cannot be measured.

Another possibility for measuring the coil temperature is known wherein the ohmic resistance or resistivity of the coil is measured and the temperature increase is determined from this measured resistance value and a reference value i.e. a resistance value of the coil when the motor is cold. This procedure can only be employed, however, when the motor is at a standstill, and is therefore unsuitable for monitoring the motor temperature while the motor is running.

It is accordingly an object of the invention to provide a device and method for detecting or determining the coil temperature in a motor, by which the temperature of the entire coil at arbitrary running conditions of the motor is determined.

SUMMARY OF THE INVENTION

With the foregoing and other objects in view, there is provided, in accordance with the invention, a device for detecting the coil temperature of a direct-current motor by determining the resistance of at least one coil of the motor, comprising means for measuring a parameter of the at least one coil while the motor is running and having a time interval in which the coil is without current.

An essential advantage of the invention is that a temperature measurement can be conducted without interrupting the running of the motor and that, for the temperature measurement within the motor, no additional elements such as sensors or the like are required.

Moreover, it is advantageous that this type of temperature measurement requires only a relatively slight expense in circuit technology and lends itself readily to retrofitting in any motor. The device can be employed in such motors in which the coils are without current during given time intervals. This applies especially to brushless direct current motors, but also to stepping motors.

In accordance with a further feature of the invention, the measuring means comprise a commutation circuit of the motor having means for generating a signal determining the length of said time interval. This is performed, for example, by the fact that the commutation signal which switches off the current in a coil forms a starting signal for a measurement, and the next signal which switches the current on again in this coil serves as a stop signal for this measurement.

In accordance with an additional feature of the invention, there is provided a series resonance circuit including the one coil, and means for exciting a resonant frequency in the resonance circuit at which a resultant current in the resonance circuit has a maximum amplitude and represents a measure of the resistance of said coil. This measurement does not require a precise pre-determination of the resonance frequency, as it is possible to scan a frequency range or band by means of the frequency generator, in accordance with an added feature of the invention. This frequency band is selected so that the resonance frequency lies within the band.

In accordance with yet another feature of the invention, the series resonance circuit is formed with at least one capacitor. Moreover, the capacitor is connected in series with the ohmic resistance and the coil inductance. With this capacitor it is, moreover, possible to decouple from the measuring circuit, during the measuring phase, voltages which have been induced into the coil.

In accordance with yet a further feature of the invention, there is provided a pulse generator connected to the one coil for applying at least one voltage pulse to the coil, and means for determining the intensity of a resultant current flow as a measure of the resistance of the coil. When the inductance of the coil is constant, this current flow depends upon the ohmic resistance of the coil and thus constitutes a measure for the change in ohmic resistance and accordingly for the change in the temperature.

In accordance with another aspect of the invention, there is provided a method of detecting the coil temperature of a direct-current motor by determining the resistance of at least one coil of the motor, which comprises measuring a parameter of the one coil while the motor is running and during a time interval in which the coil is without current.

In accordance with a further mode of the invention, the method includes generating a signal determining the length of the time interval.

In accordance with an additional mode of the invention, the method includes exciting a resonant frequency in the resonance circuit at which a resultant current in the resonance circuit has a maximum amplitude and represents a measure of the resistivity of the coil.

In accordance with an added mode of the invention, the method includes scanning a frequency range including the resonant frequency during the time interval.

In accordance with another mode of the invention, the measurement of the parameter while the motor is running is made before the coil has begun to be warmed, thereafter repeating while the motor is running and at least while the coil is becoming warmed up; and then comparing the measurements and determining the temperature change therefrom.

In accordance with a concomitant mode of the invention, at least one repeated measurement of the parameter is made after the coil has warmed up. The measurement of the ohmic resistance of the coil is thus first performed in a cold motor i.e. during or shortly after the starting phase of the motor. On the basis of this first measurement and the further measurements during the warming-up of the motor, the change in the ohmic resistance and thus the change in the temperature, with respect to a starting temperature, can be determined.

Other features which are considered as characteristic for the invention are set forth in the appended claims.

Although the invention is illustrated and described herein as embodied in a device for detecting the coil temperature of a direct-current motor, especially a brushless direct-current motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
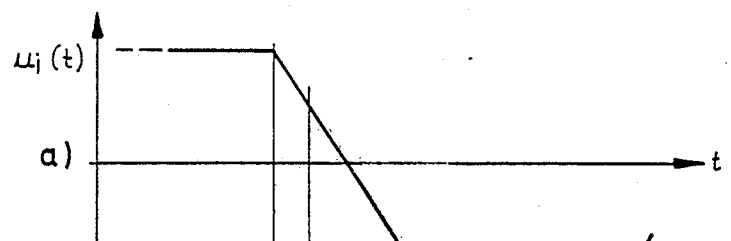
FIG. 1a is a plot diagram of a characteristic curve of the voltage induced in a coil.
FIG. 1b is a plot diagram of a characteristic curve of the motor current induced in the coil.

Referring now to the drawing and, first, particularly to FIG. 1a, there is shown therein a plot diagram of an approximately trapezoidal voltage with respect to time, the voltage having been induced in the motor coils of a brushless direct-current motor. In the interest of simplification, the voltage curve of only one coil couple is shown. The voltages induced in the other coils of a direct-current motor correspond to this voltage curve and are only phase-shifted with respect thereto.

The motor current flowing in the coils is shown in FIG. 1b. Here, too, the current in only one coil couple is represented, namely the coil couple in which the voltage shown in FIG. 1a is induced. Motor commutation switches the exciting current to the coils at the instants of time that the induced voltage shows a constant value. The illustrated saw-tooth-shaped curve of the exciting current is caused by current regulation and is without any significance for coil temperature measurement. At an instant of time $t_1$, the induced voltage drops; simultaneously, the exciting current is switched off and decays until an instant of time $t_2$ due to the conventional arrangement of freewheeling diodes in the control circuit, so that the current flows at a constant zero-level until an instant of time $t_3$. At the instant of time $t_3$, the induced voltage has reached a constant value with a negative sign and, from this instant of time on, the exciting current is switched to the coil in reversed direction. In brushless direct-current motors having three coil couples, the current flows only in two coil couples at a time. During this time interval, an induction voltage exists at the currentless coil; this voltage drops from a positive to a negative value of approximately the same amount or increases vice versa, the slope of the voltage curve, which is dependent upon the rotational speed, being approximately constant during the short measuring period.

The time interval during which no current flows between the instants of time $t_2$ and $t_3$ can be utilized as a measuring time interval. For a drive motor with a rated speed of 3000 revolutions per minute, the measuring time is about one millisecond.

The ohmic resistance of a copper coil is dependent upon the temperature and, thus, the determination of the resistance can serve for measuring the coil temperature. Due to the currentless phases, it is therefore possible to measure the coil resistance in brushless direct-current motors with the aid of a current which does not significantly influence the motor function.

Figure 2:
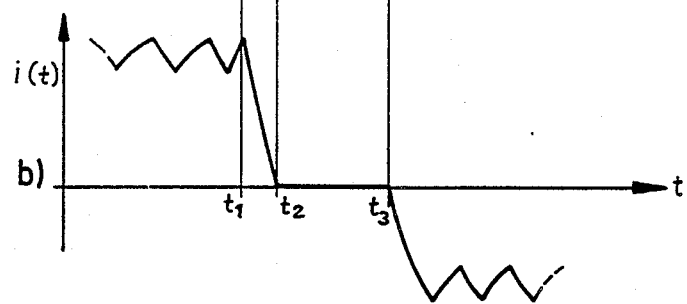
FIG. 2 is a schematic diagram of a measuring circuit according to the invention.

A measuring circuit for measuring the coil temperature is shown in FIG. 2. This measuring circuit is made up of a frequency generator 2 outputting a signal which is switched to a coil of the motor via a capacitor 3. The motor is diagrammatically illustrated as a block 1 and includes a motor coil $L_M$, a coil resistance $R_M$ and rotor 4 represented as an induction voltage generator. The measuring circuit also includes a current measuring device 5. The capacitance of the capacitor 3 is selected so that, on the one hand, the induction voltage $u_i$ does not have a disruptive effect on the generator and, on the other hand, the series resonance circuit formed of the capacitor and coil has a resonant frequency value which is located within the frequency range of the generator.

Figure 3:
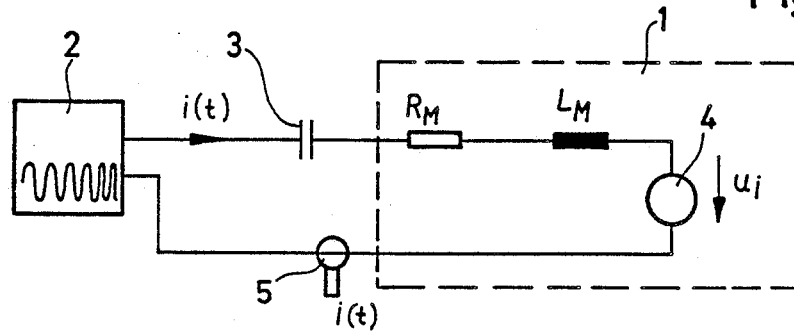
FIG. 3 is a plot diagram of characteristic curves of the measuring current in the circuit within the resonant frequency range.

During the measuring interval, the frequency generated by the generator is changed from a value below the resonant frequency to a value above the resonant frequency or vice versa. Thus, a current i(t) flows which has an intensity which increases until the resonance is exceeded, and decreases thereafter. Start and stop signals for the generator 2 can be generated e.g. by the electronic commutation system of the motor. This current i(t) is represented in FIG. 3. The maximum value of this current $i_{max}$ is a measure of the ohmic resistance $R_M$ and hence of the coil temperature $\theta$. If a first measurement of this current is carried out with a cold motor ($i_{max}\theta 1$) and a second measurement with a warm motor ($i_{max}\theta 2$), the change in resistance of the coil and thereby the change in temperature of the coil, with respect to a starting temperature, can be determined from the change in the maximum value of the current ($i_{max}$).

Figure 4:
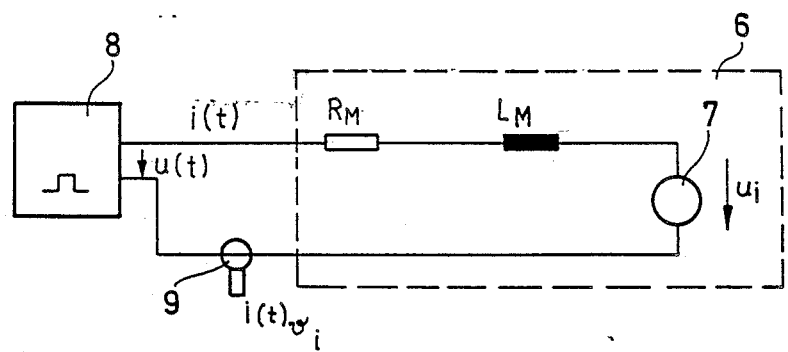
FIG. 4 is a schematic diagram like that of FIG. 2 of another embodiment of the measuring circuit.

FIG. 4 illustrates another measuring device. Within a block 6, there are shown components of a motor such as the motor coil $L_M$, the coil resistance $R_M$ and an induction voltage generator 7. A pulse generator 8 generating rectangular voltage pulses is connected to the coil $L_M$. A current measuring device 9 measures the current in the motor coil $L_M$.

Figure 5:
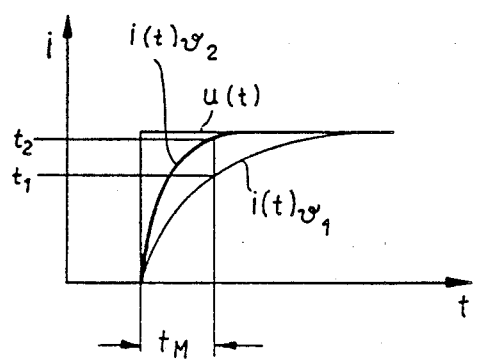
FIG. 5 is a plot diagram of characteristic curves of the measuring current with an underlying step function of the voltage.

FIG. 5 shows a characteristic curve of a voltage u(t) having a rising edge which is generated by the pulse generator 8. The current produced by this voltage is represented at different coil temperatures $\theta_1$, $\theta_2$; namely for the temperature $\theta_1$, the current curve $i(t)\theta_1$ and, for the temperature $\theta_2$, the current curve $i(t)\theta_2$. Because i(t) increases in accordance with an e-function with the time constant $T=L_M/R_M$, the time period of the increase in the current is a measure of the value of the coil resistance. After a given measuring time period $t_m$, the current intensity is measured and thus directly provides a measure for the temperature and for the temperature change, respectively, of the coil. The flow of the current $i(t)\theta_1$ would be determined, for example, for a cold motor, and the flow of the current $i(t)\theta_2$ for a warm motor. From the various values of the current intensity, after the measuring time $t_m$, the temperature change may thus be readily determined.

The influence of the induction voltage $u_i$ *which varies during the measuring time interval $t_2$ to $t_3$* (FIG. 1) can e.g. be eliminated by limiting the length of the entire measuring process and by setting the measuring time interval symmetrical with respect to the zero crossover of the induced voltage $u_1$.

A further possibility for measuring the temperature change by means of a pulse generator is to switch off the measuring voltage $u(t)$ in dependence upon a maximum current limit $i(t)$ and to switch it on when reaching a minimum current limit $i(t)$, so that a switching frequency dependent upon the resistance $R_M$ is set up and can thus also be employed as a measure of the change in resistance and of the change of temperature, respectively, in the coil.

The foregoing is a description corresponding in substance to German Application No. P 37 06 659.5, dated Mar. 2, 1987, the International priority of which is being claimed for the instant application, and which is hereby made part of this application. Any material discrepancies between the foregoing specification and the aforementioned corresponding German application are to be resolved in favor of the latter.

We claim:

1. Device for detecting the coil temperature of a direct-current motor by determining the resistance of at least one coil of the motor, comprising means for measuring a parameter of the at least one coil while the motor is running and during a time interval in which the coil is without current.

2. Device according to claim 1 comprising a series resonance circuit including said one coil, and means for exciting a resonant frequency in said resonance circuit at which a resultant current in said resonance circuit has a maximum amplitude and represents a measure of the resistance of said coil.

3. Device according to claim 2, wherein said exciting means include a frequency generator connected to said resonance circuit, and means for scanning a frequency range including said resonant frequency during said time interval.

4. Device according to claim 2 wherein said series resonance circuit is formed with at least one capacitor.

5. Device for detecting the coil temperature of a direct-current motor by determining the resistance of at least one coil of the motor, comprising means for measuring a parameter of the at least one coil while the motor is running and during a time interval in which the coil is without current, and wherein said measuring means comprise a commutation circuit of the motor having means for generating a signal determining the length of said time interval.

6. Device for detecting the coil temperature of a direct-current motor by determining the resistance of at least one coil of the motor, comprising means for measuring a parameter of the at least one coil while the motor is running and during a time interval in which the coil is without current, and a pulse generator connected to said one coil for applying at least one voltage pulse to said coil, and means for determining the intensity of a resultant current flow as a measure of the resistance of said coil.

7. Method of detecting the coil temperature of a direct-current motor by determining the resistance of at least one coil of the motor, which comprises measuring a parameter of the one coil while the motor is running and during a time interval in which the coil is without current.

8. Method according to claim 7, which includes a series resonant circuit including said one coil, exciting a resonant frequency in the resonance circuit at which a resultant current in the resonance circuit has a maximum amplitude and represents a measure of the resistance of the coil.

9. Method according to claim 7, wherein the measurement of the parameter while the motor is running is made before the coil has begun to be warmed, thereafter repeating while the motor is running and at least while the coil is becoming warmed up; and them comparing the measurements and determining the temperature change therefrom.

10. Method according to claim 9, wherein at least one repeated measurement of the parameter is made after the coil has warmed up.

11. Method of detecting the coil temperature of a direct-current motor by determining the resistance of at least one coil of the motor, which comprises measuring a parameter of the one coil while the motor is running and during a time interval in which the coil is without current, and generating a signal determining the length of the time interval.

12. Method of detecting the coil temperature of a direct current motor by determining the resistance of at least one coil of the motor, which comprises measuring a parameter of the one coil while the motor is running and during a time interval in which the coil is without current, exciting a resonant frequency in the resonance circuit at which a resultant current in the resonance circuit has a maximum amplitude and represents a measure of the resistance of the coil, and scanning a frequency range including the resonant frequency during the time interval.

* * * * *